(12) United States Patent
Yang

(10) Patent No.: US 7,602,573 B2
(45) Date of Patent: Oct. 13, 2009

(54) DEVICE AND METHOD FOR ADJUSTING DISTANCE BETWEEN MAGNETIC HEAD AND DATA STORAGE MEDIUM

(75) Inventor: Won-Choul Yang, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/775,244

(22) Filed: Jul. 10, 2007

(65) Prior Publication Data
US 2008/0037157 A1   Feb. 14, 2008

(30) Foreign Application Priority Data
Jul. 12, 2006   (KR) .................. 10-2006-0065297

(51) Int. Cl.
*G11B 21/02* (2006.01)

(52) U.S. Cl. .................. 360/75; 360/31; 360/97.02

(58) Field of Classification Search .................. None
See application file for complete search history.

(56) References Cited

U.S. PATENT DOCUMENTS

| | | | |
|---|---|---|---|
| 5,377,058 A | 12/1994 | Good et al. | |
| 6,288,856 B1 | 9/2001 | Ottesen et al. | |
| 7,369,341 B2 * | 5/2008 | Yokohata et al. | ............ 360/31 |
| 2003/0174430 A1 * | 9/2003 | Takahashi et al. | ............ 360/75 |
| 2005/0046982 A1 | 3/2005 | Liu et al. | |
| 2005/0152055 A1 * | 7/2005 | Biskeborn | ............ 360/31 |

FOREIGN PATENT DOCUMENTS

JP        05-081807        4/1993

* cited by examiner

*Primary Examiner*—Jason C Olson
(74) *Attorney, Agent, or Firm*—Volentine & Whitt, PLLC

(57) ABSTRACT

A device and method for adjusting a distance between a magnetic head and a data storage medium are provided. In the device, a microprocessor outputs a control signal for adjusting the distance to a pre-amplifier based on a correlation between a flying height (FH) and a coefficient of a fifth tap of an adaptive digital filter included in a read/write (R/W) channel circuit or a correlation between the FH and a discrete Fourier transformed third harmonic signal output from the R/W channel circuit. The pre-amplifier outputs a voltage or current for flying on demand (FOD) to the magnetic head based on the control signal. The magnetic head adjusts the distance in real time based on the voltage or current for FOD.

22 Claims, 15 Drawing Sheets

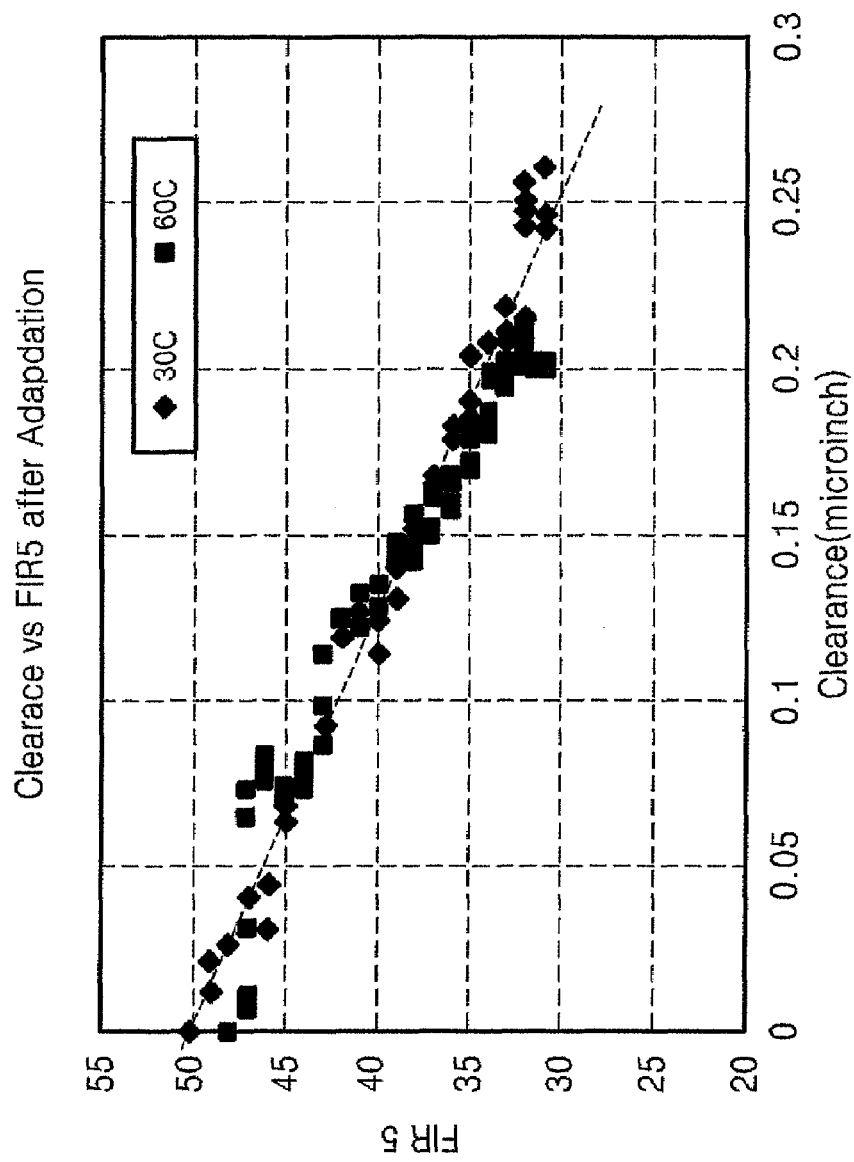

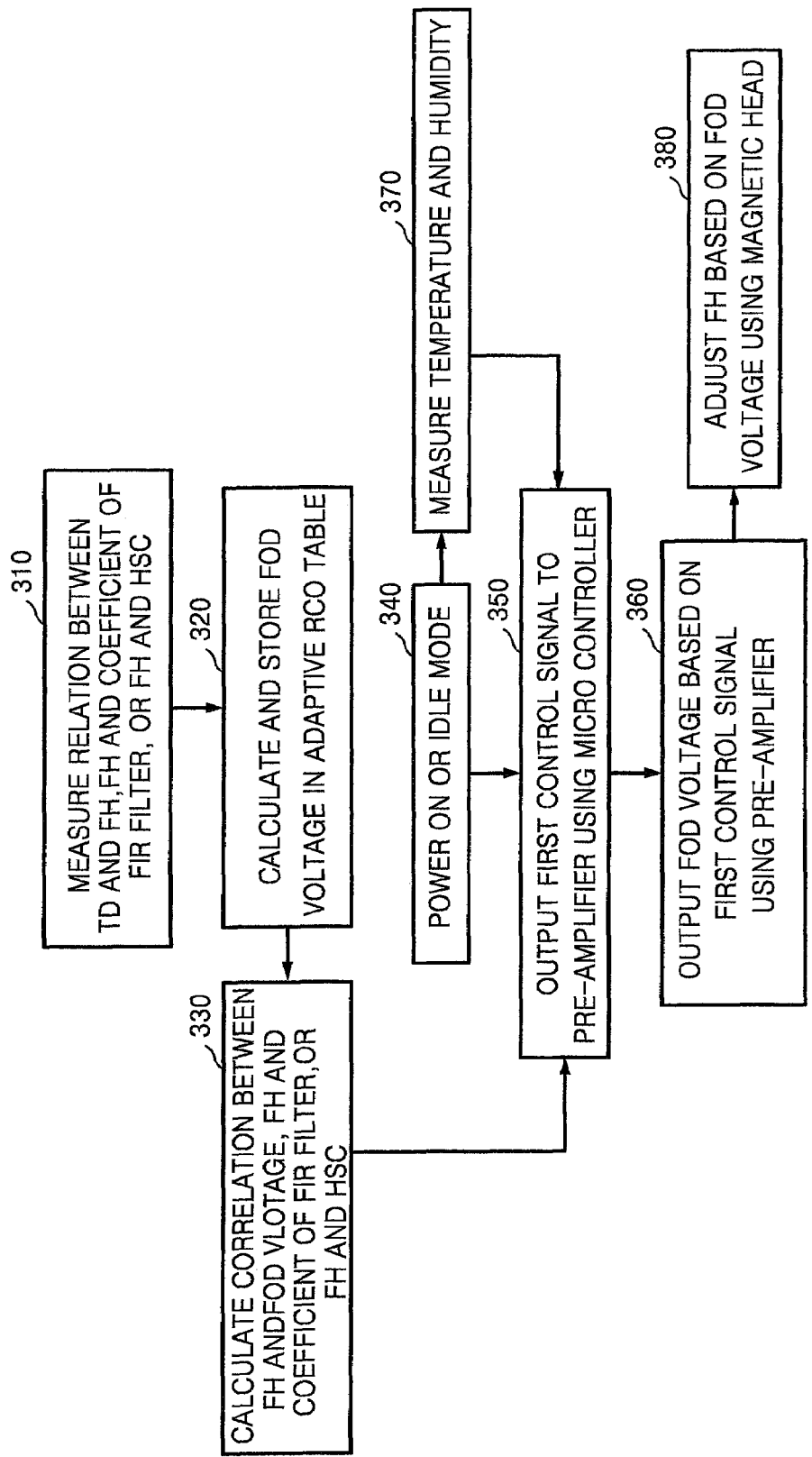

DEVICE AND METHOD FOR ADJUSTING DISTANCE BETWEEN MAGNETIC HEAD AND DATA STORAGE MEDIUM

BACKGROUND OF THE INVENTION

1. Field of the Invention

The present invention relates to data storage devices, and more particularly, the present invention relates to the positional control of a magnetic head relative to a data storage medium.

A claim of priority under 35 U.S.C. § 119 is made to Korean Patent Application No. 2006-0065297, filed Jul. 12, 2006, the disclosure of which is hereby incorporated by reference herein as if set forth in its entirety.

2. Description of the Related Art

Data storage devices, such as hard disk drives, are used as auxiliary memory for computer systems, and typically include a data storage medium (e.g., a disk) which stores data and a magnetic head. The magnetic head includes a write head (or write element) used to write data into the data storage medium and a read head (or read element) used to read data from the data storage medium.

Together with increases in tracks per inch (TPI) and bits per inch (BPI), the amount of data stored in a data storage medium has rapidly increased and the size of the data storage medium has rapidly decreased. As such, it has become necessary to decrease the floating height or flying height (FH) of a magnetic head from a surface of the data storage medium in order to increase the write performance of a write head and/or the read performance of a read head. Generally, the distance between a magnetic head and a data storage medium is referred to as a floating height, a flying height, a clearance, a head gap, a spacing or a spacing loss.

However, when the FH of a magnetic head decreases, the magnetic head can easily collide with the surface of the data storage medium when subjected to even minor impact during operation, and therefore, the magnetic head and/or the surface of the data storage medium may be damaged. Accordingly, it is necessary to appropriately control the FH.

There have been attempts to maximize the capacity of a data storage device by appropriately controlling the FH, and flying-on-demand (FOD) is an example of one such attempt. FOD is a method of controlling the FH using thermal expansion of a pole tip hat located at an end of a magnetic head.

FOD may be implemented using a slider having an air bearing surface (ABS) (which is referred to as an "air bearing slider"). In detail, a heater similar to a write coil of a write head is provided on the ABS and current for FOD is supplied to the heater. Then, the end of the ABS expands due to heat and changes the FH. Accordingly, the FH can be adjusted by controlling the amount of current supplied to the heater.

Generally, the FH or clearance can be measured using a touchdown method while the current supplied to the heater is being controlled. In the touchdown method, a current FH of a magnetic head is a distance between the current FH and a height at which the magnetic head touches down on the surface of a storage medium (i.e., the FH is "0"). However, it is troublesome for users to measure the FH using the touchdown method every time. Moreover, any change in the FH caused by variations in temperature, humidity, or air pressure decreases the reliability of a data storage device.

SUMMARY OF THE INVENTION

According to an aspect of the present invention, a data storage device is provided which includes a data storage medium, a magnetic head which reads a pattern from the data storage medium and generates a corresponding analog read signal, a pre-amplifier which amplifies the analog read signal output from the magnetic head and outputs a corresponding amplified analog read signal, and an analog-to-digital converter which converts the analog read signal output by the pre-amplifier into a digital signal. The data storage device further includes a discrete Fourier transformer which executes a discrete Fourier transformation of the digital signal output from the analog-to-digital converter and outputs a corresponding discrete Fourier transformed signal which correlates with a distance between the data storage medium and the magnetic head, a processor which generates a first control signal based on the discrete Fourier transformed signal, and a control circuit which is responsive to the first control signal to output a second control signal to the magnetic head which adjusts a distance between the magnetic head and the data storage medium.

According to another aspect of the present invention, a data storage device is provided which includes a data storage medium, a magnetic head which reads a pattern from the data storage medium and generates a corresponding analog read signal, a pre-amplifier which amplifies the analog read signal output from the magnetic head and outputs a corresponding amplified analog read signal, and an analog-to-digital converter which converts the analog read signal output by the pre-amplifier into a digital signal. The data storage device further includes an adaptive digital filter which filters the digital signal output by the analog-to-digital converter, the adaptive digital filter comprising a plurality of taps at which a respective plurality of filter coefficients are applied, where the filter coefficients are adaptively set in accordance with an output of the adaptive digital filter and an adaptive algorithm, and wherein at least one of the filter coefficients is correlative of a distance between the magnetic head and the data storage medium, a processor which generates a first control signal based on the at least one the filter coefficients of the adaptive digital filter, and a control circuit which is responsive to the first control signal to output a second control signal to the magnetic head which adjusts a distance between the magnetic head and the data storage medium.

According to another aspect of the present invention, a method of adjusting a distance between an air bearing slider and a data storage medium of a data storage device is provided. The method includes reading a pattern from an area of the data storage medium and outputting a read signal using a read head of the air bearing slider, amplifying the read signal and outputting an amplified read signal, outputting a first control signal based on the amplified read signal using a channel circuit, calculating a distance between the read head and the data storage medium based on the first control signal and generating a second control signal based on a result of the calculation, using a processor, and outputting a third control signal for controlling the distance between the air bearing slider and the data storage medium.

BRIEF DESCRIPTION OF THE DRAWINGS

The above and other features and advantages of the present invention will become readily apparent from the detailed description that follows, with reference to the accompanying drawings, in which:

FIGS. 3A through 3D are graphs illustrating a procedure for obtaining a correlation between a coefficient of a fifth tap of a finite impulse response (FIR) filter and a flying height (FH) using the coefficient of the fifth tap of the FIR filter, the FH, and a flying on demand (FOD) voltage, in an embodiment of the present invention;

FIG. 9 is a flowchart of a method of adjusting an FH according to an embodiment of the present invention.

DETAILED DESCRIPTION OF EMBODIMENTS

Figure 1:
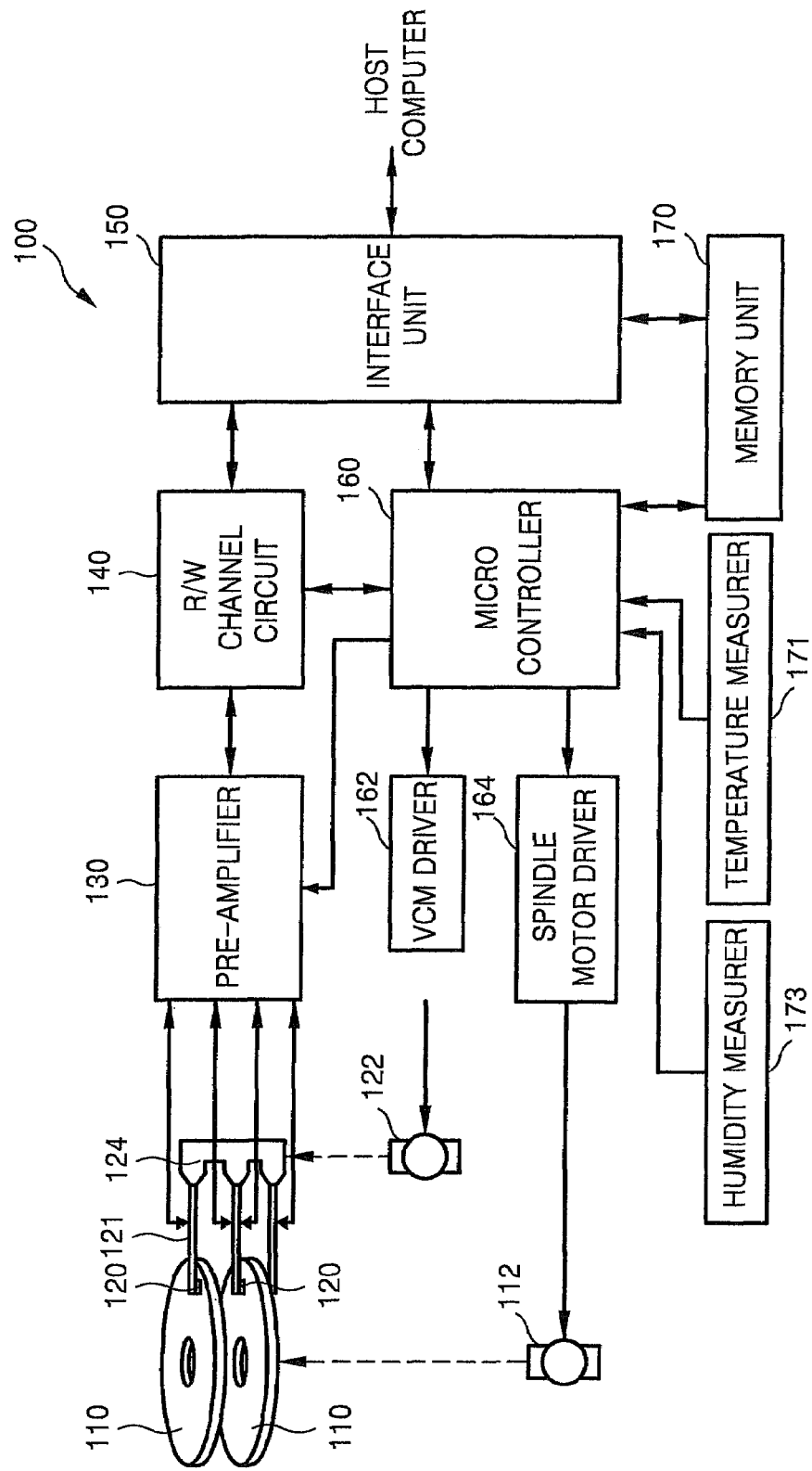
FIG. 1 is a functional block diagram of a data storage device according to an embodiment of the present invention.

The attached drawings for illustrating preferred embodiments of the present invention are referred to in order to gain a sufficient understanding of the present invention, the merits thereof, and the objectives accomplished by the implementation of the present invention. Hereinafter, the present invention will be described in detail by explaining preferred embodiments of the invention with reference to the attached drawings. Like reference numerals in the drawings denote like elements.

FIG. 1 is a functional block diagram of a data storage device 100 according to an embodiment of the present invention. Referring to FIG. 1, the data storage device (e.g., hard disk drive) 100 of this example includes a plurality of data storage media (e.g., magnetic disks) 110, a spindle motor 112, a plurality of magnetic heads 120, a voice coil motor (VCM) 122, an actuator 124, a pre-amplifier 130, a read/write (R/W) channel circuit 140, a interface unit (referred to as a "hard disk controller") 150, a microcontroller 160, a VCM driver 162, a spindle motor driver 164, and a memory unit 170. The data storage device 100 may further include a temperature sensor 171 and/or a humidity sensor 173.

Each of the data storage media 110 includes a plurality of concentric circular tracks and is rotated by the spindle motor 112. Each of the magnetic heads 120 is controlled by the microcontroller 160 to be positioned relative a corresponding one of the data storage media 110 to perform read and write operations. Each of the magnetic heads 120 includes a write head and a read head and is mounted on a slider. An air bearing slider includes a read head, a write head, and an air bearing surface (ABS).

Each of the magnetic heads 120 is installed at a flexible suspension arm (not shown) of a corresponding rigid actuator arm among a plurality of rigid actuator arms 121 which are installed at the actuator 124. Each of the rigid actuator arms 121 is controlled by the VCM driver 162 to move a corresponding one of the magnetic heads 120 from one recording track to another one on a corresponding one of the data storage media 110.

Each of the magnetic heads 120 reads a predetermined pattern from a predetermined area on a corresponding one of the data storage media 110 and generates an analog read signal. The predetermined pattern is a pattern that an adaptive digital filter or a discrete Fourier transformer according to an embodiment of the present invention can read and may be a unique signal having a predetermined period.

When data is read from one among the plurality of the data storage media 110, the pre-amplifier 130 receives an analog read signal, which is picked up by a corresponding magnetic head (specifically, a read head) among the plurality of the magnetic heads 120, amplifies the analog read signal, and outputs the amplified analog read signal to the R/W channel circuit 140.

When data is written into one of the plurality of the data storage media 110, the pre-amplifier 130 controls a corresponding magnetic head (specifically, a write head) among the plurality of the magnetic heads 120 to write a write signal, which is applied by the R/W channel circuit 140, into the data storage medium 110.

The R/W channel circuit 140 detects a data pulse from an amplified analog read signal output from the pre-amplifier 130, decodes the data pulse, and outputs read data to the interface unit 150. In addition, the R/W channel circuit 140 encodes write data output from the interface unit 150 and outputs the encoded write data to the pre-amplifier 130. The read data or the write data may be temporarily stored in the memory unit 170.

Also, the R/W channel circuit 140 converts an analog read signal output from the pre-amplifier 130 into a digital signal, performs discrete Fourier transform of the digital signal, and outputs the discrete Fourier transformed signal to the microcontroller 160. The discrete Fourier transformed signal is related with a third harmonic included in the analog read signal output from the pre-amplifier 130.

Figure 2:
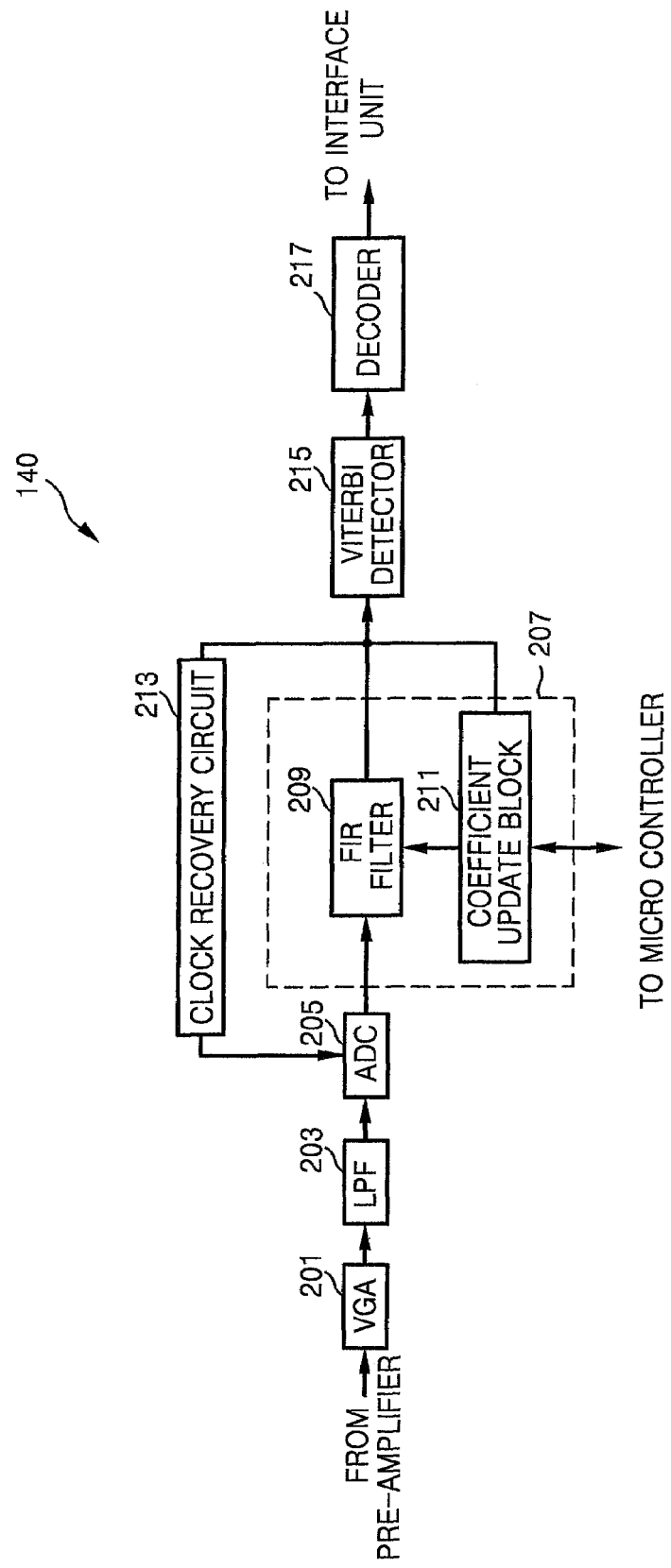
FIG. 2 is a functional block diagram of a read/write channel circuit according to an embodiment of the present invention.
Figure 7:
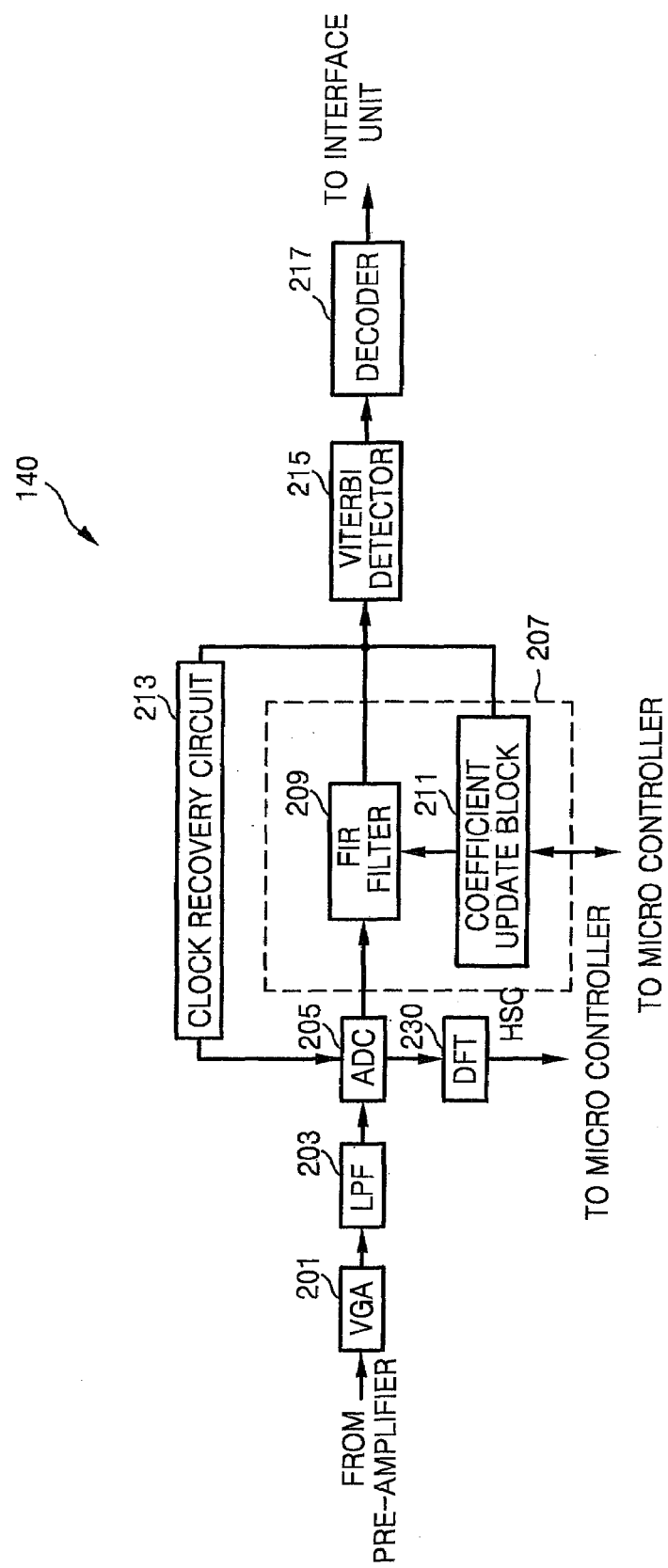
FIG. 7 is a functional block diagram of a read/write channel circuit according to another embodiment of the present invention.

The R/W channel circuit 140 includes an analog-to-digital converter (ADC) 205 and an adaptive digital filter 207, as illustrated in FIG. 2 or 7. The ADC 205 converts an analog read signal output from the pre-amplifier 130 into a digital signal. The adaptive digital filter 207 outputs one coefficient among a plurality of coefficients to the microcontroller 160. One coefficient may be the coefficient of a main tap or a coefficient related with a fifth tap among a plurality of taps.

The interface unit 150 is controlled by the microcontroller 160 to transmit data to be written onto the data storage media 110 to the R/W channel circuit 140 and to transmit data read from the data storage media 110 to a host computer. In addition, the interface unit 150 may transmit a read command signal or a write command signal, which is output from the host computer, to the microcontroller 160 or the memory unit 170 and may transmit read data or write data, which is stored in the memory unit 170, to the host computer or the R/W channel circuit 140 in response to a control signal output from the microcontroller 160. Accordingly, the interface unit 150 may perform the interface between the host computer and the R/W channel circuit 140, between the microcontroller 160 and the host computer, between the memory unit 170 and the microcontroller 160, and between the memory unit 170 and the R/W channel circuit 140.

The microcontroller 160 outputs a control signal to the R/W channel circuit 140 via the interface unit 150 in response to a read command signal or a write command signal output from the host computer and controls the VCM driver 162 and the spindle motor driver 164 based on servo information received from the R/W channel circuit 140 in order to control track seek and/or track following. The microcontroller 160 may output a servo gate signal directly to the R/W channel circuit 140. In other embodiments of the present invention, the R/W channel circuit 140, the interface unit 150, and the microcontroller 160 may be implemented on a single chip.

In the current embodiment of the present invention, the microcontroller 160 calculates a distance or clearance between a magnetic head 120 and a corresponding data storage medium 110 based on a correlation or a functional relation between a discrete Fourier transformed signal (e.g., the amplitude of a third harmonic) output from the R/W channel circuit 140 and the distance (or clearance) between the magnetic head 120 and the data storage medium 110. The microcontroller 160 generates a first control signal based on a result of the calculation. Different terms, a floating height, a flying height, a clearance, a head gap, a spacing, and a spacing loss substantially indicate the distance between the magnetic head 120 and the data storage medium 110. The microcontroller 160 may be implemented by a digital signal processor or a microprocessor. The microcontroller 160 may be referred to as a central processing unit (CPU). The first control signal may be directly input to the pre-amplifier 130 through predetermined wiring or may be input to the pre-amplifier 130 via the interface unit 150 and the R/W channel circuit 140. In response to the first control signal from microprocessor 160, the pre-amplifier 130 outputs a second control signal to adjust a distance between a magnetic head 120 and data storage medium 110 to the magnetic head 120.

In another embodiment of the present invention, the microcontroller 160 may calculate the distance between the magnetic head 120 and the data storage medium 110 using a coefficient of one tap of an adaptive digital filter or a signal corresponding to the coefficient, which is output from the R/W channel circuit 140, and may generate the first control signal based on a result of the calculation. A method of calculating the distance or a correlation used in embodiments of the present invention will be described in detail with reference FIGS. 3A through 6. In this embodiment, the first control signal may also be directly input to the pre-amplifier 130 through predetermined wiring or may be input to the pre-amplifier 130 via the interface unit 150 and the R/W channel circuit 140.

The pre-amplifier 130 outputs a second control signal for adjusting the distance between the magnetic head 120 and the data storage medium 110 to the magnetic head 120 in response to the first control signal output from the microcontroller 160. The second control signal may be a flying on demand (FOD) voltage or current for FOD. Accordingly, the distance between the magnetic head 120 and the data storage medium 110 can be maintained constant based on the second control signal.

The memory unit 170 may temporarily store data transmitted among the host computer, the microcontroller 160, and the R/W channel circuit 140 and stores various programs, which can be executed by the microcontroller 160, and various configuration values.

The VCM driver 162 generates a driving current for driving the VCM 122 in response to position control signals provided by the microcontroller 160. The position control signals are provided to control the positions of the magnetic heads 120, respectively. The position control signals may be generated based on servo information output from the R/W channel circuit 140. The VCM 122 moves one of the magnetic heads 120 attached to the actuator 124 onto a corresponding one of the data storage media 110 based on the direction and/or level of the driving current supplied from the VCM driver 162.

The spindle motor driver 164 drives the spindle motor 112 in response to a control signal generated by the microcontroller 160 so that the data storage media 110 rotate at a predetermined velocity (e.g., 3600 through 7200 rpm). The VCM driver 162 and the spindle motor driver 164 may be implemented on a single chip.

The temperature sensor 171 measures an internal temperature of the data storage device 100 and transmits a signal corresponding to a result of the measurement to the microcontroller 160. The humidity sensor 173 measures an internal humidity of the data storage device 100 and transmits a signal corresponding to a result of the measurement to the microcontroller 160.

FIG. 2 is a functional block diagram of the R/W channel circuit 140 according to an embodiment of the present invention. A method of executing a real-time measurement/adjustment of the distance (e.g., flying height) between the magnetic head 120 and the data storage medium 110 (or a flying height) will be described with reference to FIGS. 1 and 2. For the clarity of the description, FIG. 2 illustrates a read channel which reads data from the data storage medium 110.

The read channel (for example, a channel used to detect a read signal using a partial response maximum likelihood (PRML) method) includes a variable gain amplifier (VGA) 201, a low-pass filter (LPF) 203, an analog-to-digital converter (ADC) 205, an adaptive digital filter 207, a clock recovery circuit 213, a Viterbi detector 215, and a decoder (e.g., an error correction code (ECC) decoder) 217.

The VGA 201 receives and amplifies a signal output from the pre-amplifier 130. The LPF 203 removes high-frequency noise from an analog read signal amplified by the VGA 201 and outputs a noise-removed analog read signal.

The ADC 205 converts the analog read signal output from the LPF 203 into a digital read signal in response to a predetermined clock signal output from the clock recovery circuit 213.

The adaptive digital filter 207 filters the digital read signal output from the ADC 205 and outputs a filtered digital read signal. The adaptive digital filter 207 may be implemented by an adaptive finite impulse response (FIR) filter.

The adaptive digital filter 207 includes a FIR filter 209 and a coefficient update block 211. As is well known, the FIR filter 209 includes a plurality of taps (or registers) and equalizes the digital read signal output from the ADC 205. The coefficient update block 211 has a structure in which a plurality of coefficients (or weights) related with the plurality of taps in the FIR filter 209 can be changed or updated on the fly based on an output signal of the FIR filter 209 and a predetermined adaptive algorithm. The predetermined adaptive algorithm may be a least mean square (LMS) algorithm, but the present embodiment is not restricted thereto. Since the LMS algorithm is well known to those skilled in the art, a description thereof is omitted here.

A value of each of the plurality of coefficients related with the plurality of taps in the FIR filter 209 may be provided to the microcontroller 160 in real time. Accordingly, the microcontroller 160 can outputs a first control signal to the pre-amplifier 130 based on a coefficient related with a main tap or a fifth tap among the plurality of coefficients. The microcontroller 160 may include software or firmware for generating the first signal output to the pre-amplifier 130 based on the coefficient related with the main tap or the fifth tap. The software or firmware may be stored in a predetermined processor (not shown) inside or outside the microcontroller 160.

FIGS. 3A through 3D are graphs illustrating a procedure for obtaining a correlation between a coefficient of a fifth tap of a FIR filter and a flying height (FH) using the coefficient of the fifth tap of the FIR filter, the FH, and a FOD voltage.

Figure 3A:
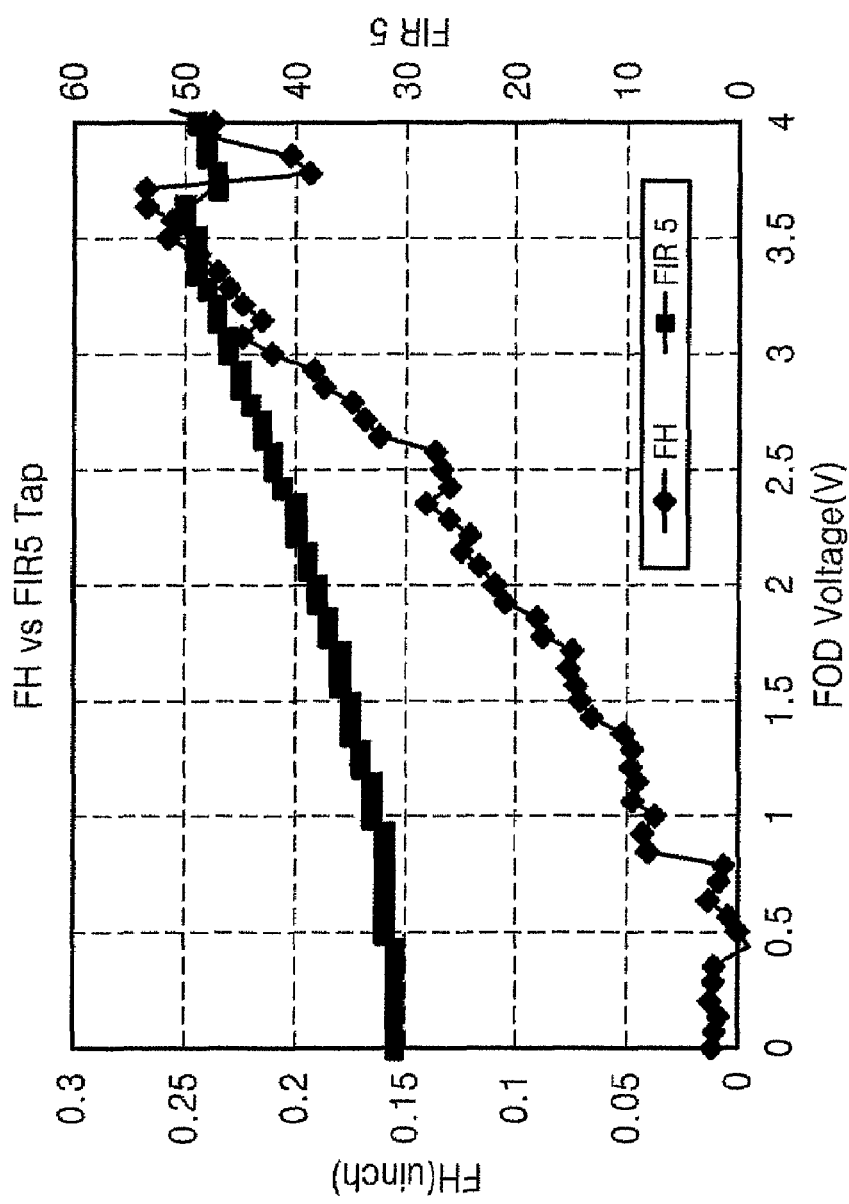
Figure 3B:
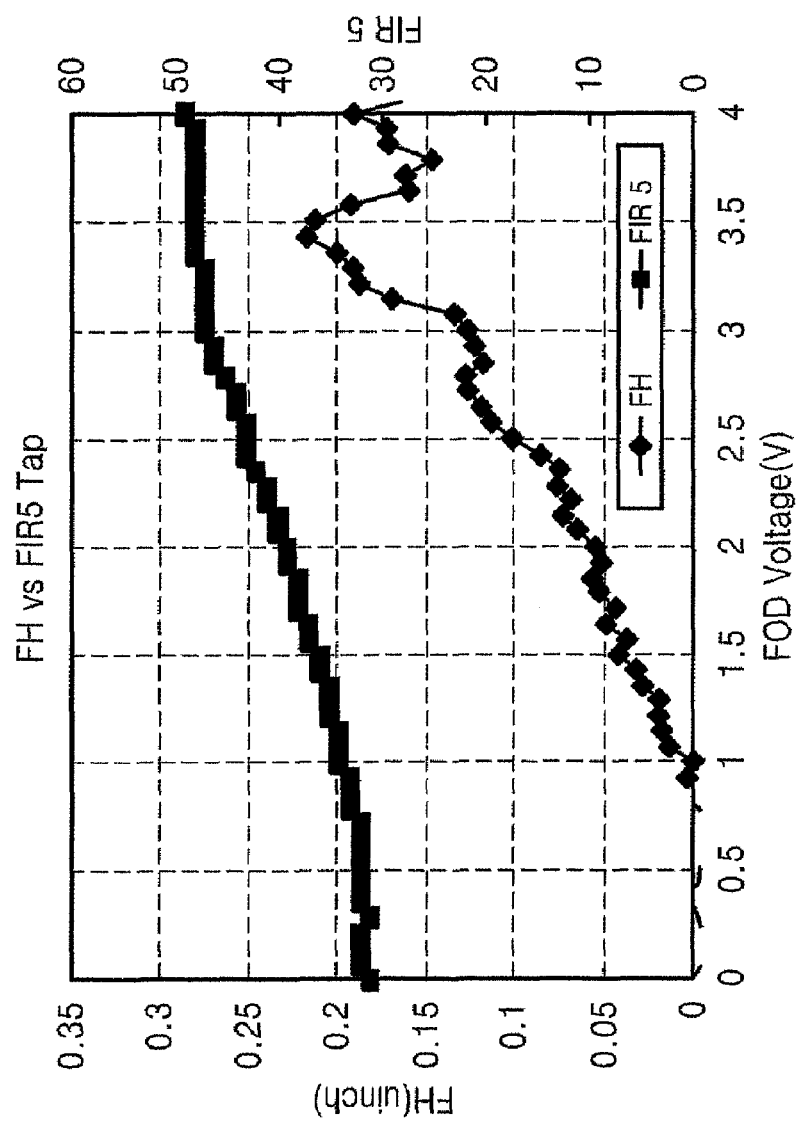
Figure 3C:
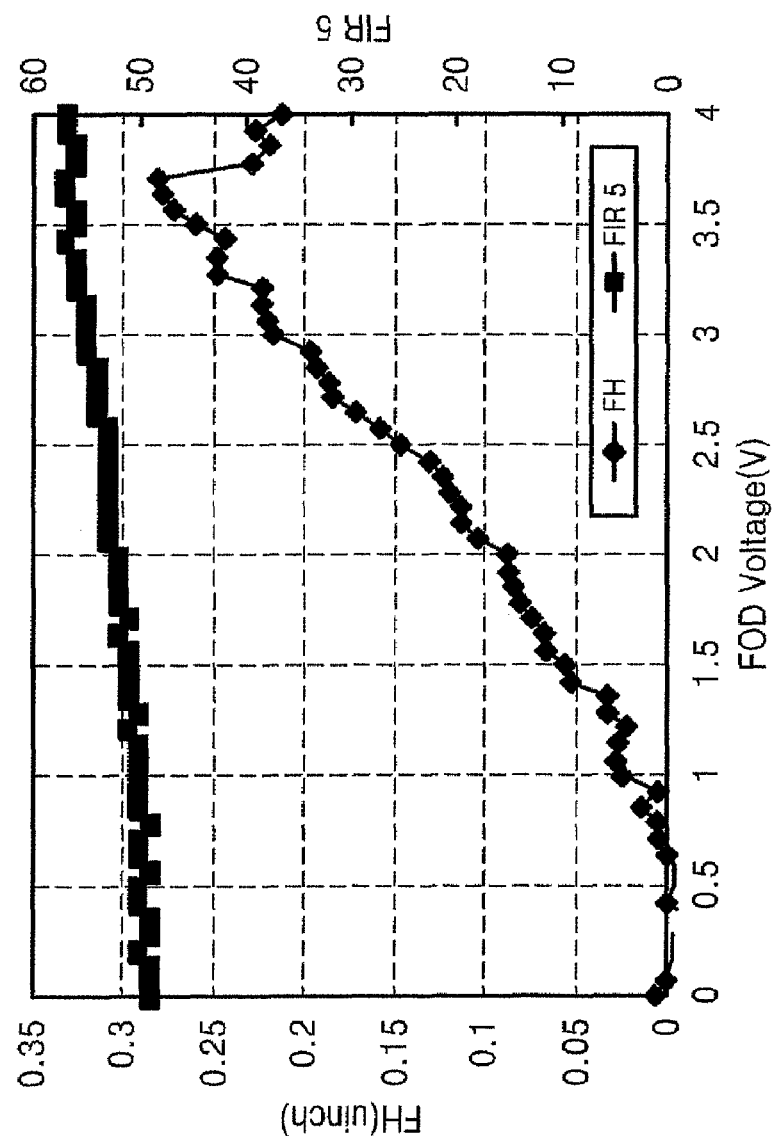

FIG. 3A illustrates a graph of a fifth tap's coefficient FIR5 versus an FH (e.g., in micro inches) and a graph of the FH versus a FOD voltage, in a data area at an outside diameter and at ambient temperature. FIG. 3B illustrates a graph of the fifth tap's coefficient FIR5 versus the FH and a graph of the FH versus the FOD voltage, in the data area at the outside diameter and at high temperature. FIG. 3C illustrates a graph of the fifth tap's coefficient FIR5 versus the FH and a graph of the FH versus the FOD voltage, in a data area in a maintenance cylinder and at ambient temperature. FIG. 3D is a graph illustrating the correlation or functional relation between the fifth tap's coefficient FIR5 and the FH at temperatures of 30° C. and 60° C. after the adaptation of the adaptive digital filter 207.

FIGS. 3A through 3D illustrate correlations which are measured and calculated during burn-in of the data storage device 100 and then stored in the microcontroller 160 or the memory unit 170. In embodiments of the present invention, measured data illustrated in FIGS. 3A through 3D may be stored in the microcontroller 160. In this case, the microcontroller 160 may calculate the correlation or functional relation between the fifth tap's coefficient FIR5 and the FH in real time based on the data and output a first control signal based on a result of the calculation.

Accordingly, the microcontroller 160 may calculate the FH based on the fifth tap's coefficient FIR5 of the adaptive digital filter 207 or a signal corresponding to the fifth tap's coefficient FIR5, which is output from the R/W channel circuit 140, and the correlation or functional relation between the fifth tap's coefficient FIR5 and the FH, which is calculated during the burn-in; and may output a first control signal corresponding to a result of calculating the FH to the pre-amplifier 130. In other words, the microcontroller 160 can output to the pre-amplifier 130 a first control signal for controlling the FH in real time according to the change in the fifth tap's coefficient FIR5 which changes in real time. The microcontroller 160 may include a processor that stores software or firmware for expressing or calculating the correlation.

The pre-amplifier 130 may output a second control signal for controlling the distance or clearance between the magnetic head 120 and the data storage medium 110, for example, a voltage or current for FOD, to the magnetic head 120 through a wire or trace in response to the first control signal output from the microcontroller 160 in real time.

The ABS of an air bearing slider including the magnetic head 120 or a pole tip at the end of the magnetic head 120 is thermally expanded in response to the second control signal so that the distance or clearance between the magnetic head 120 and the data storage medium 110 can be adjusted in real time. The thermal expansion of the ABS for controlling the distance between the magnetic head 120 and the data storage medium 110 is controlled based on the second control signal input to the ABS. As a result, the data storage device 100 can adjust the FH in real time.

Figure 4A:
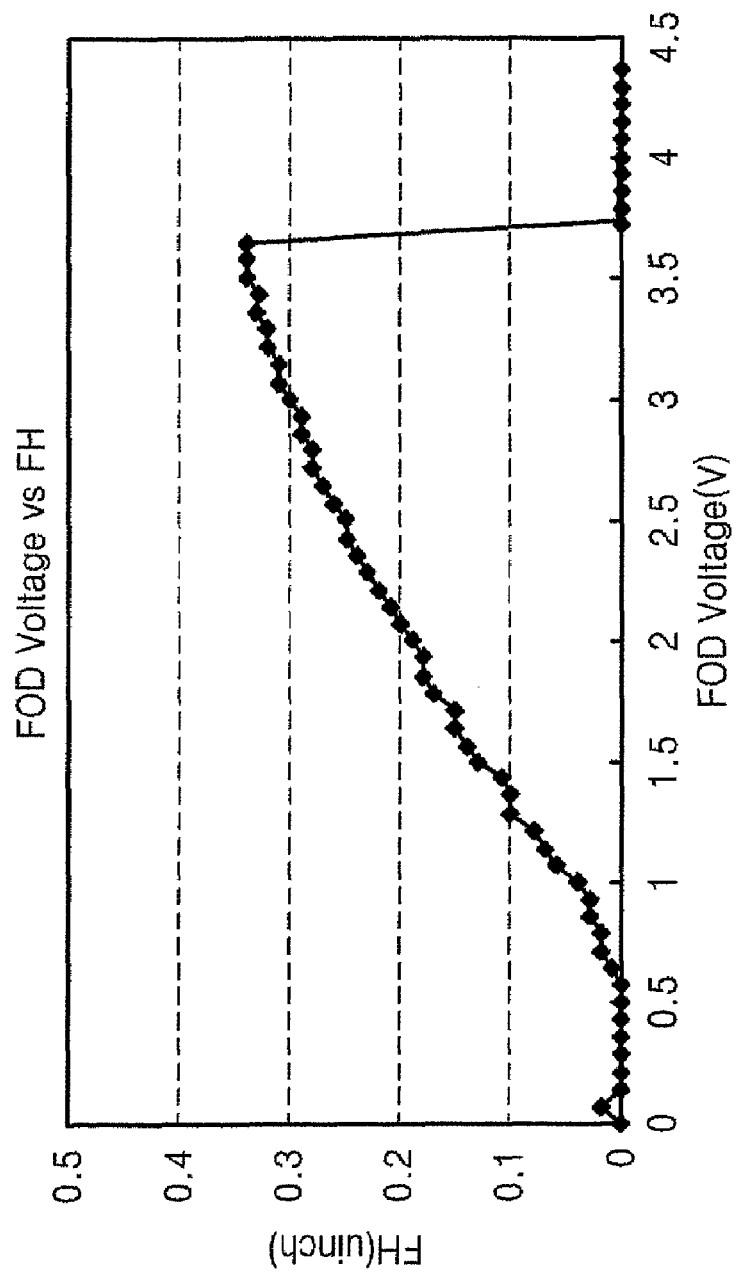
FIGS. 4A through 4D are graphs illustrating a procedure for obtaining a correlation between a coefficient of a fifth tap of a FIR filter and an FH using a touchdown test, in an embodiment of the present invention.
Figure 4B:
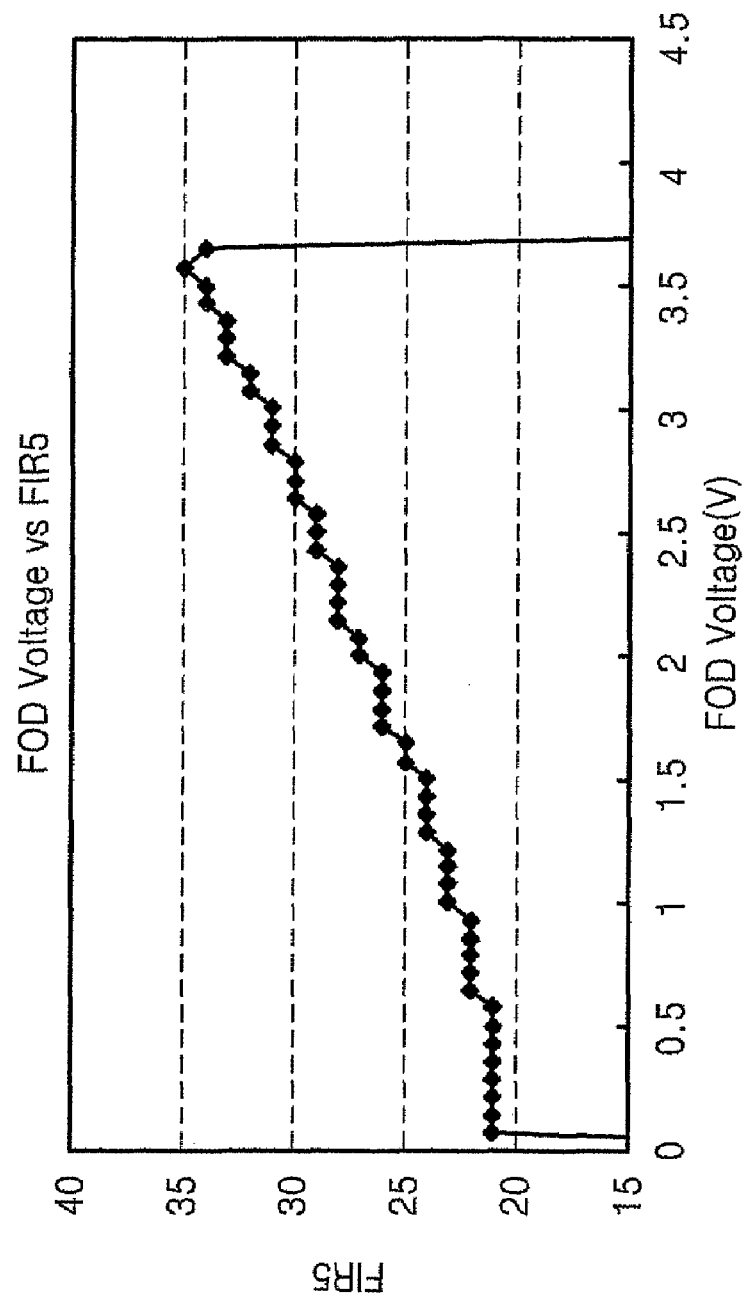
Figure 4C:
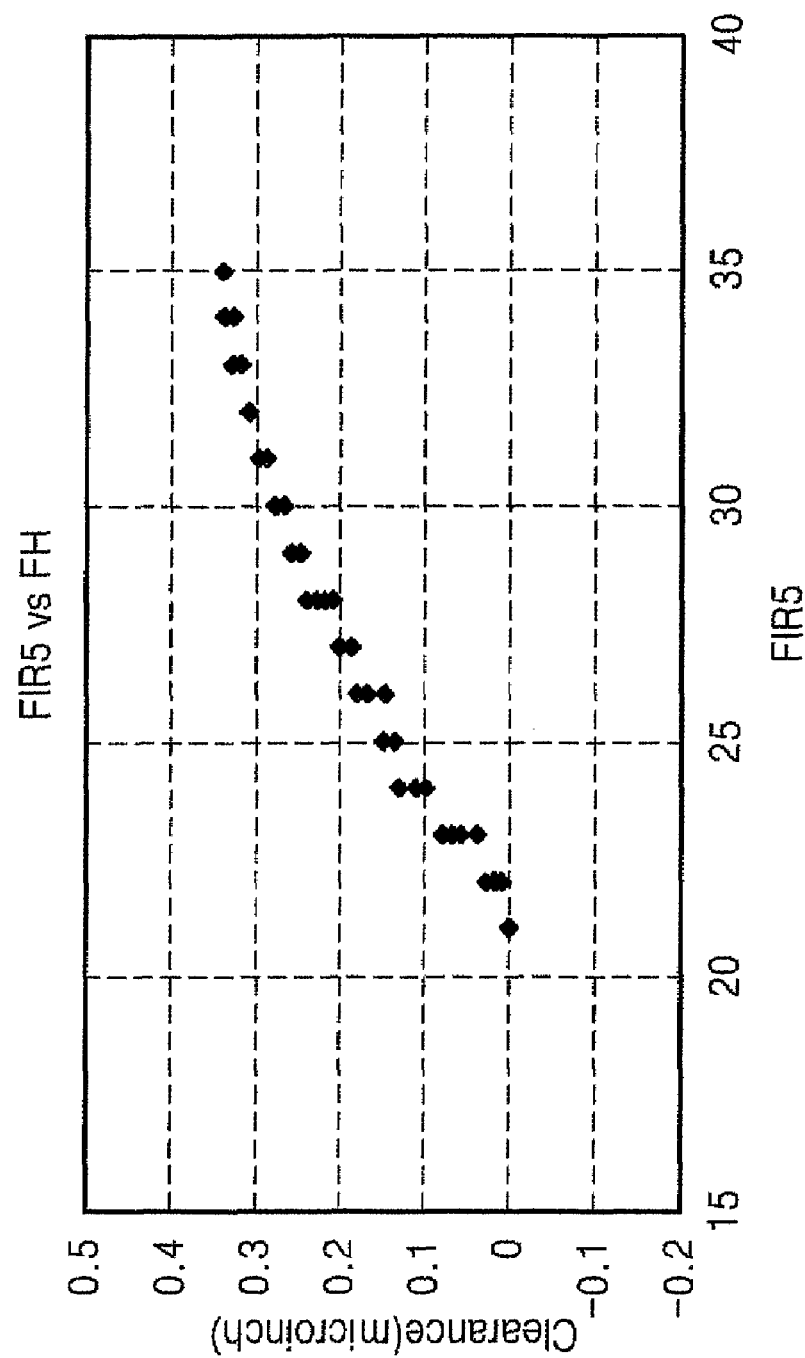
Figure 4D:
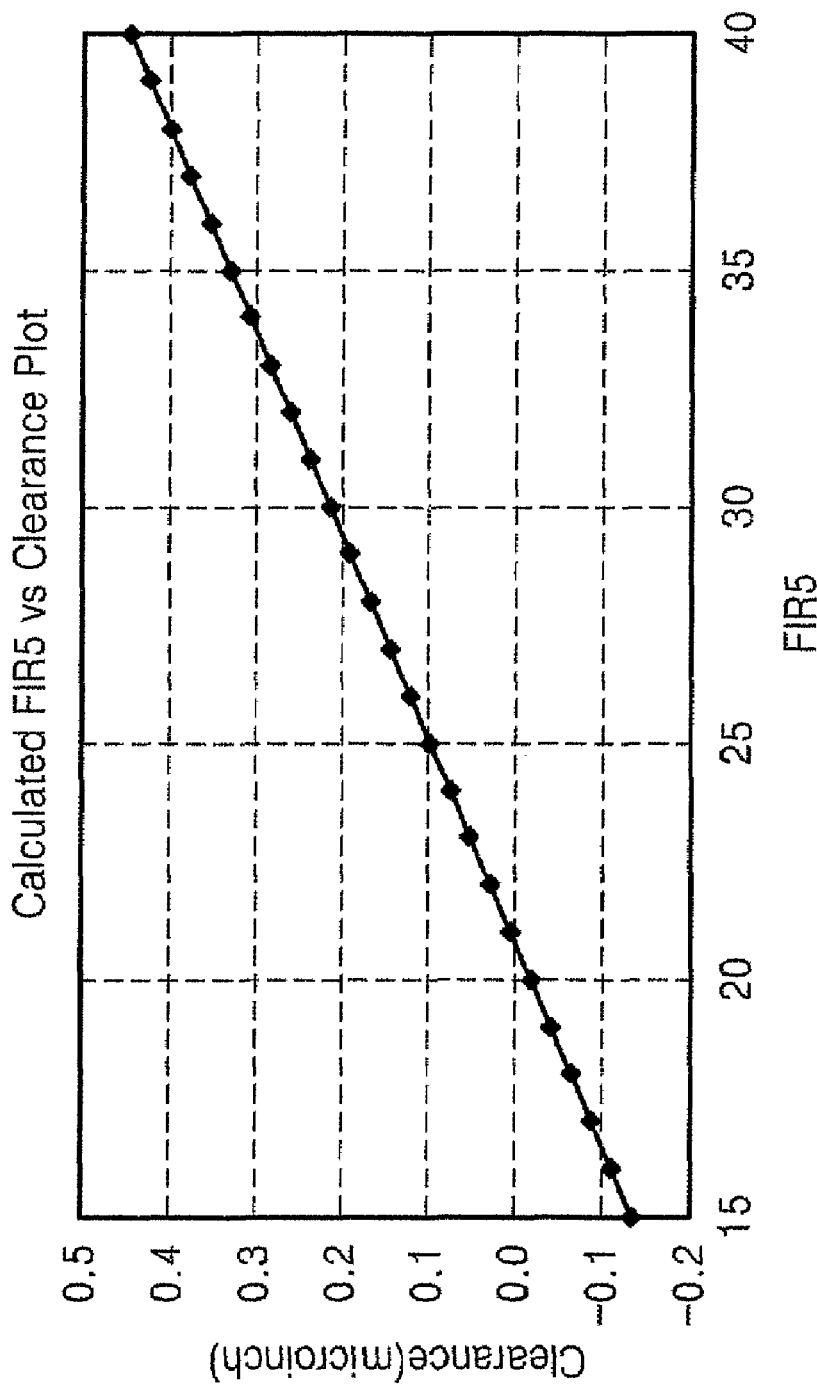

FIGS. 4A through 4D are graphs for use in describing a procedure for obtaining a correlation between the fifth tap's coefficient FIR5 of a FIR filter and the FH using a touchdown test. In particular, FIG. 4A is a graph of the FOD voltage versus the FH in the touchdown test. FIG. 4B is a graph of the fifth tap's coefficient FIR5 versus the FOD voltage in the touchdown test. FIG. 4C is a graph of the fifth tap's coefficient FIR5 of the adaptive digital filter 207 versus the FH. FIG. 4D is a graph obtained by linearizing a relation between the fifth tap's coefficient FIR5 of the adaptive digital filter 207 and the FH based on the correlation between the fifth tap's coefficient FIR5 and the FH.

Figure 5:
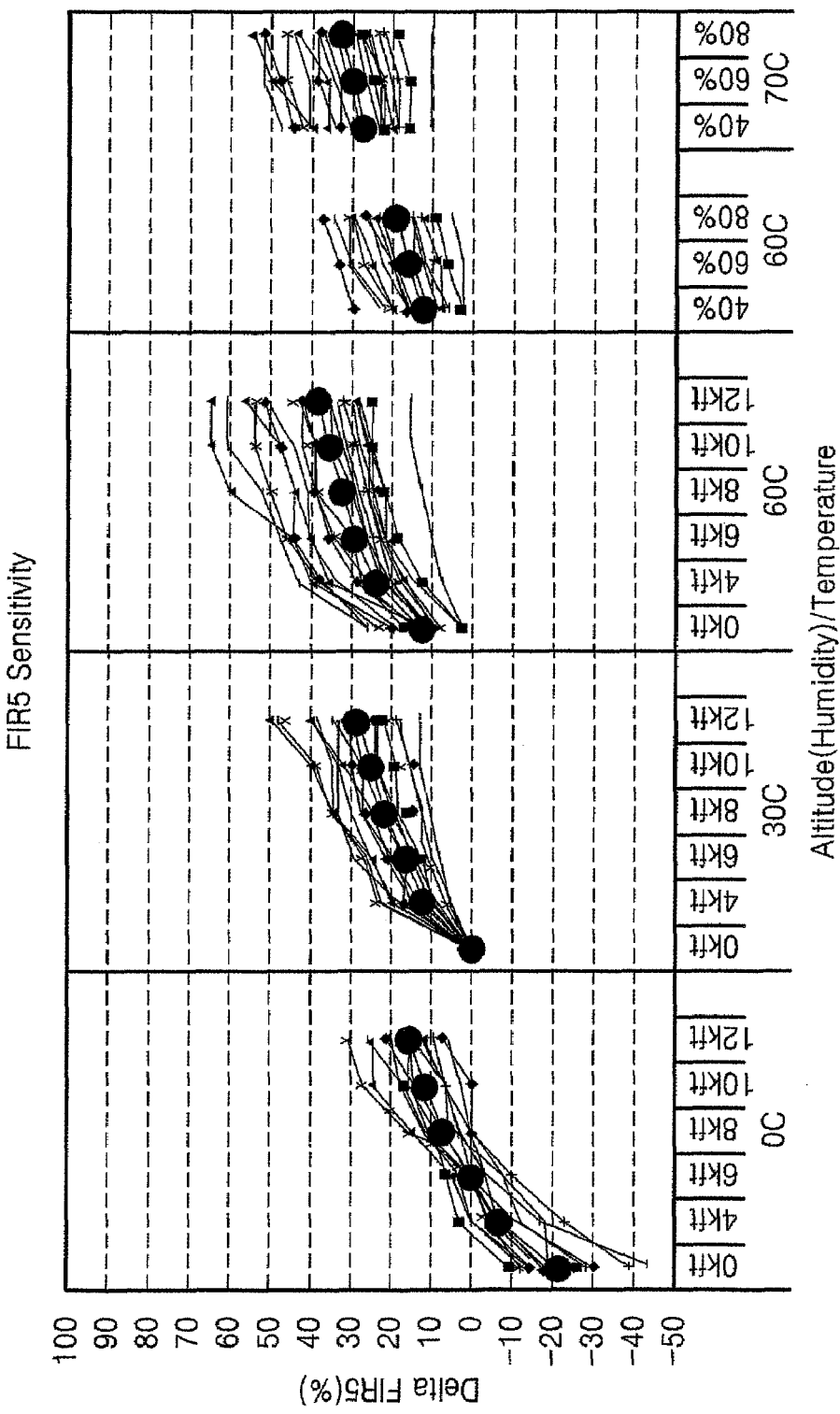
FIG. 5 is a graph illustrating the sensitivity of a coefficient of a fifth tap of a FIR filter with respect to temperature, humidity, and altitude, in an embodiment of the present invention.

FIG. 5 is a graph illustrating the sensitivity of the fifth tap's coefficient FIR5 of a FIR filter with respect to temperature, humidity, and altitude, in an embodiment of the present invention. Referring to FIG. 5, the fifth tap's coefficient FIR5 varies with at least one factor among temperature, humidity, and altitude. Accordingly, the data storage device 100 may additionally include the temperature sensor 171. At this time, the microcontroller 160 may output the first control signal based on the fifth tap's coefficient FIR5 of the adaptive digital filter 207 and a signal output from the temperature sensor 171. In other words, the microcontroller 160 may compensate for the influence of temperature upon the FH and output the first control signal based on the compensation.

In addition, the data storage device 100 may additionally include the humidity sensor 173. At this time, the microcontroller 160 may output the first control signal based on the fifth tap's coefficient FIR5 of the adaptive digital filter 207 and a signal output from the humidity sensor 173. In other words, the microcontroller 160 may compensate for the influence of humidity upon the FH and output the first control signal based on the compensation. The data storage device 100 may additionally include both the temperature sensor 171 and the humidity sensor 173. At this time, the microcontroller 160 may output the first control signal based on the fifth tap's coefficient FIR5 of the adaptive digital filter 207, the signal output from the temperature sensor 171, and the signal output from the humidity sensor 173.

Figure 6:
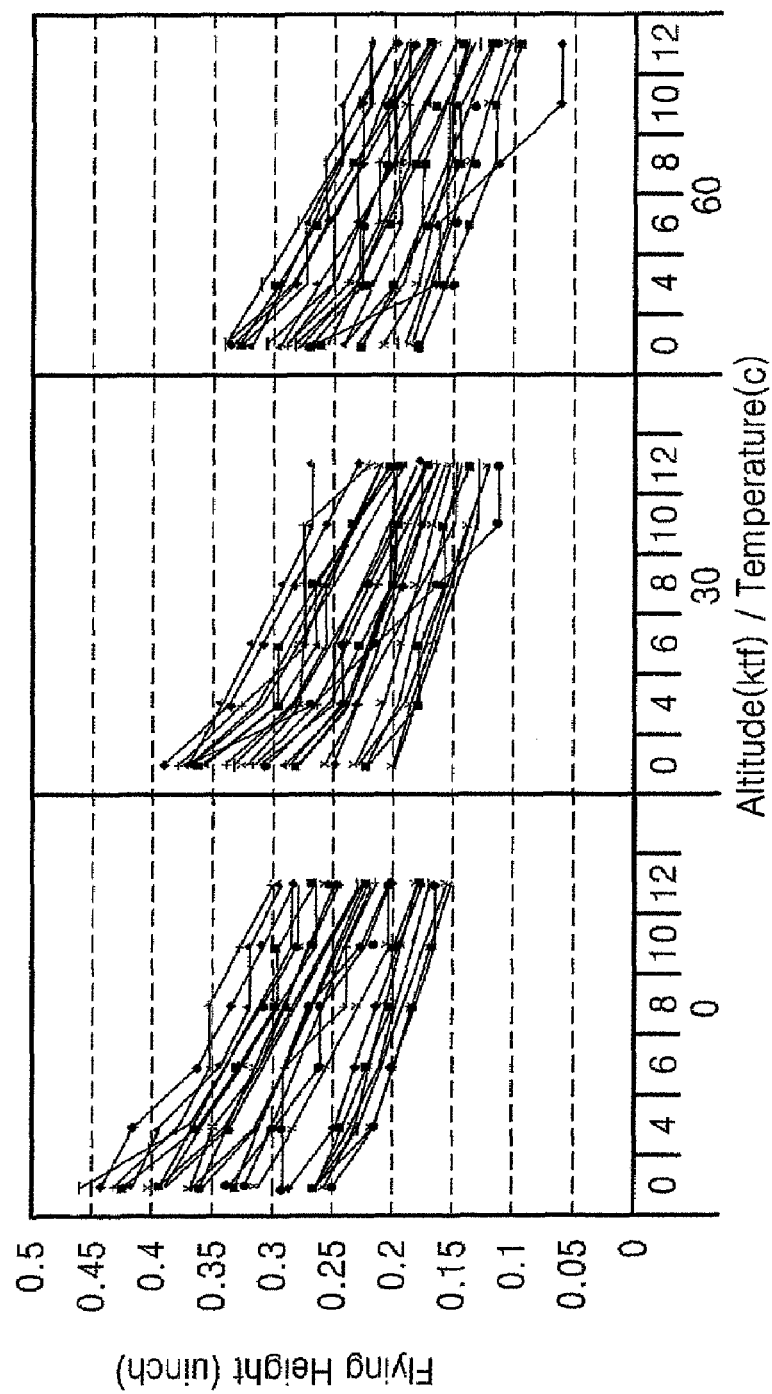
FIG. 6 is a graph illustrating an FH with respect to temperature and altitude, in an embodiment of the present invention.

FIG. 6 is a graph illustrating an FH with respect to temperature and altitude, in an embodiment of the present invention. Referring to FIG. 6, when temperature increases, the FH decreases. When altitude increases, the FH decreases. In addition, when air pressure decreases, the FH also decreases.

As illustrated in FIGS. 3A through 6, the fifth tap's coefficient FIR5 of the adaptive digital filter 207 is influenced by at least one influencing factor among temperature, humidity, and air pressure. Accordingly, if the correlation between a relation between the fifth tap's coefficient FIR5 of the adaptive digital filter 207 and the FH and a relation between the FH and the FOD voltage is measured or calculated with respect to at least one factor among temperature, humidity, and air pressure during burn-in, the FH can be calculated in real time based on the measured or calculated correlation. When the FOD voltage is controlled based on the measure or calculated FH, the FH can be controlled in real time.

The clock recovery circuit 213 illustrated in FIG. 2 or FIG. 7 generates a predetermined clock signal based on a signal output from the FIR filter 209 and outputs the clock signal to the ADC 205. The ADC 205 performs analog-to-digital conversion using the clock signal as a sampling clock signal. The Viterbi detector 215 decodes the signal output from the FIR filter 209 and outputs decoded data. The decoder 217 receives the decoded data from the Viterbi detector 215, decodes the data, and outputs reproduced read data to the interface unit 150.

Figure 8:
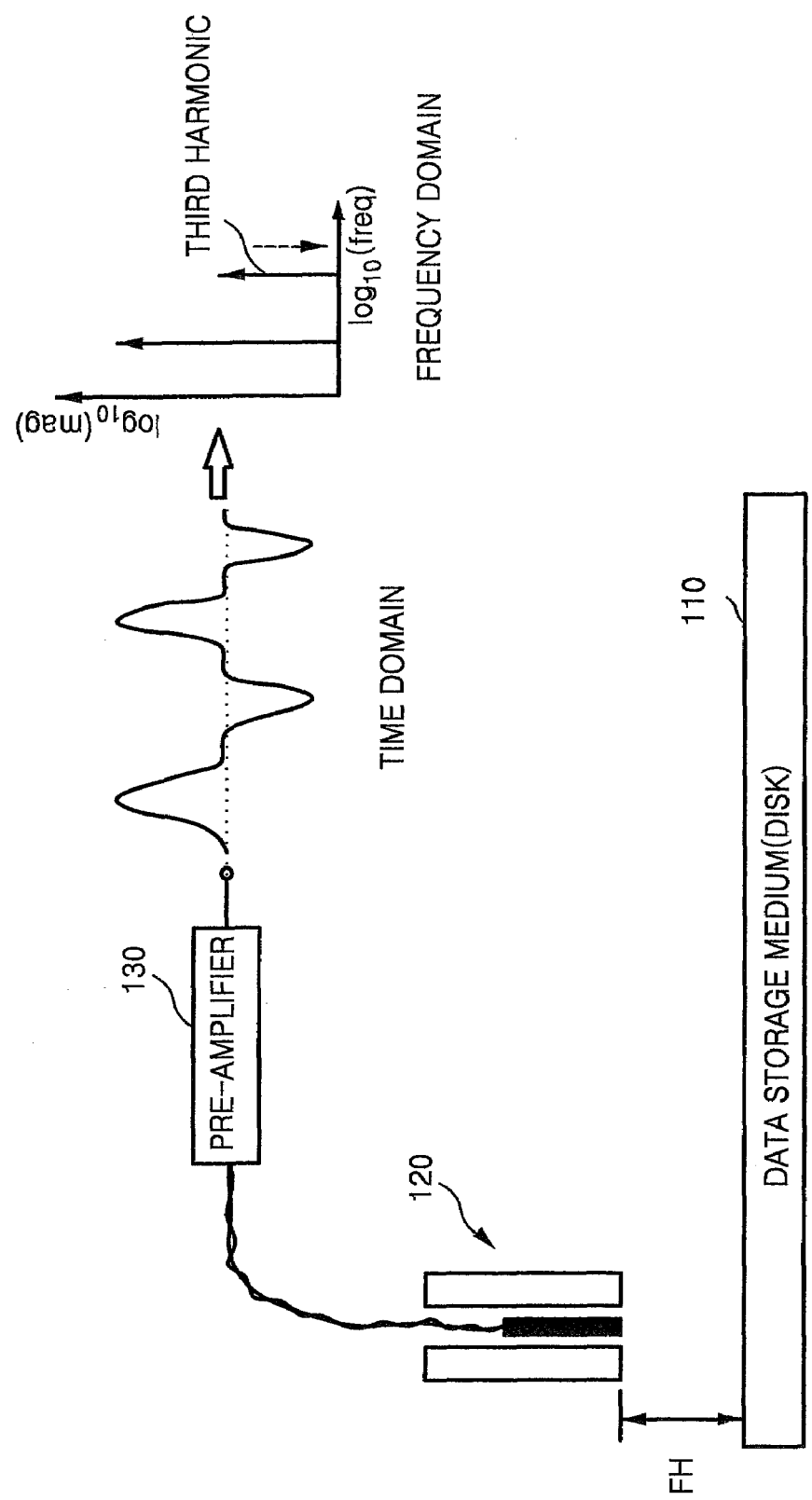
FIG. 8 is a conceptual diagram illustrating a method of measuring an FH using a third harmonic according to an embodiment of the present invention.

FIG. 7 is a functional block diagram of the read/write channel circuit 140 according to another embodiment of the present invention. All elements illustrated in FIG. 7 except for a discrete Fourier transformer (DFT) 230 are similar to those illustrated in FIG. 2. FIG. 8 is a conceptual diagram illustrating a method of measuring an FH using a third harmonic according to an embodiment of the present invention.

The DFT 230 performs discrete Fourier transform of a digital signal output from the ADC 205 and outputs a discrete Fourier transformed signal HSC to the microcontroller 160.

When the distance between the magnetic head 120 and the data storage medium 110 increases, the amplitude of a signal, and particularly, a third harmonic output from the pre-amplifier 130 is decreased in a time domain. Accordingly, the magnitude ($\log_{10}$(mag)) of the third harmonic output from the DFT 230 is also decreased in a frequency domain.

In the current embodiment, the data storage device 100 may measure or calculate a correlation between the distance between the magnetic head 120 and the data storage medium 110 and the magnitude ($\log_{10}$(mag)) of the third harmonic output from the DFT 230, and adjust the FH in real time based on the measured or calculated correlation and the magnitude ($\log_{10}$(mag)) of the third harmonic. In other words, the microcontroller 160 calculates the distance between the magnetic head 120 and the data storage medium 110 based on the correlation between the discrete Fourier transformed signal HSC output from the DFT 230 of the R/W channel circuit 140 and the FH, and outputs a first control signal to the pre-amplifier 130 based on a result of the calculation. The correlation may have been compensated with respect to one or more influencing factors such as temperature, humidity, and air pressure (or altitude), as is described with reference to FIGS. 5 and 6. At this time, the microcontroller 160 outputs the first control signal to the pre-amplifier 130 based on the compensated correlation. The pre-amplifier 130 outputs a second control signal, for example, a voltage or current for FOD, to the magnetic head 120 based on the first control signal.

Accordingly, the data storage device 100 or the pre-amplifier 130 can control the distance between the magnetic head 120 and the data storage medium 110 or the FH in real time based on the fifth tap's coefficient FIR5 of the adaptive digital filter 207 or the third harmonic, regardless of influencing factors such as at least one of temperature, humidity, and air pressure.

FIG. 9 is a flowchart for describing a method of adjusting an FH according to an embodiment of the present invention. Referring to FIGS. 1 through 9, in operation 310, at least one relation among a relation between touchdown TD and an FH, a relation between the FH and a coefficient of a predetermined tap, e.g., a fifth tap's coefficient, of the adaptive digital filter 207, and a relation between the FH and a discrete Fourier transformed signal HSC is measured empirically or statistically during burn-in.

In operation 320, a FOD voltage is calculated based on the at least one measured relation and then stored in an adaptive read channel optimization (RCO) table. The adaptive RCO table may be stored in at least one of the microcontroller 160 and or memory unit 170.

In operation 330, at least one correlation among a correlation (or functional relation) between the FH and the FOD voltage, a correlation (or functional relation) between the FH and the predetermined tap's coefficient (e.g., the fifth tap's coefficient) of the adaptive digital filter 207, and a correlation (or functional relation) between the FH and the discrete Fourier transformed signal HSC output from the DFT 230 of the adaptive digital filter 207 is calculated, and then stored in at least one of the microcontroller 160 or the memory unit 170.

When power is supplied to the data storage device 100 after the burn-in or an idle mode is entered in operation 340, the microcontroller 160 of the data storage device 100 outputs a first control signal for controlling the FH to the pre-amplifier 130 based on the predetermined tap's coefficient of the adaptive digital filter 207 in operation 350.

In operation 360, the pre-amplifier 130 outputs a second control signal, e.g., a voltage or current for FOD, to the magnetic head 120 based on the first control signal.

In operation 380, the FH is adjusted in real time based on the second control signal provided to the magnetic head 120. In operation 370, the temperature sensor 171 and the humidity sensor 173 measure the internal temperature and humidity of the data storage device 100 and output results of the measurement to the microcontroller 160. In operation 350, the microcontroller 160 outputs to the pre-amplifier 130 a first control signal obtained by compensating the correlation calculated in operation 330 for the influence of the temperature and humidity based on signals output from the temperature sensor 171 and the humidity sensor 173.

As described above, a distance between a magnetic head and a data storage medium can be measured in real time and an FH can be adjusted in real time based on a result of the measurement, without using a touchdown method. In addition, the distance between the magnetic head and the data storage medium can be measured in real time and the FH can be adjusted in real time based on a result of the measurement, regardless of influencing factors such as one or more of temperature, humidity, and air pressure. Accordingly, reliability of a data storage device is increased.

A correlation measured or calculated during burn-in can be embodied as computer readable program codes on a recording medium (e.g., internal memory of the microcontroller 160 or the memory unit 170) that can be read on a computer (e.g., the microcontroller 160). The computer readable recording medium may be any data storage device that can store data which can be thereafter read by a computer system. Examples of the computer readable recording medium include read-only memory (ROM), random-access memory (RAM), and flash memory. The computer readable recording medium can also be distributed over a network coupled computer systems so that the computer readable code is stored and executed in a distributed fashion. Also, functional programs, codes, and code segments can be readily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A data storage device comprising:
a data storage medium;
a magnetic head which reads a pattern from the data storage medium and generates a corresponding analog read signal;
a pre-amplifier which amplifies the analog read signal output from the magnetic head and outputs a corresponding amplified analog read signal;
an analog-to-digital converter which converts the analog read signal output by the pre-amplifier into a digital signal;
a discrete Fourier transformer which executes a discrete Fourier transformation of the digital signal output from the analog-to-digital converter and outputs a corresponding discrete Fourier transformed signal;
a temperature sensor, which is separate from the magnetic head, and which senses an internal temperature of the data storage device and outputs a temperature signal denoting the internal temperature of the data storage device;
a processor which receives the discrete Fourier transformed signal and the temperature signal, and which generates a first control signal based on the discrete Fourier transformed signal and the temperature signal; and
a control circuit which is responsive to the first control signal to output a second control signal to the magnetic head which adjusts a distance between the magnetic head and the data storage medium.

2. The data storage device of claim 1, wherein the discrete Fourier transformer executes a discrete Fourier transformation of a third harmonic included in the digital signal.

3. The data storage device of claim 1, further comprising an air bearing slider which includes the magnetic head and an air bearing surface, wherein a thermal expansion of the air bearing surface is controlled by the second control signal to adjust the distance between the magnetic head and the data storage medium.

4. The data storage device of claim 1, wherein the processor generates the first control signal in real time with changes in the distance between the magnetic head and the data storage medium.

5. The data storage device of claim 1, wherein the second control signal is a flying-on-demand voltage or current.

6. A data storage device comprising: a data storage medium;
a magnetic head which reads a pattern from the data storage medium and generates a corresponding analog read signal;
a pre-amplifier which amplifies the analog read signal output from the magnetic head and outputs a corresponding amplified analog read signal;
an analog-to-digital converter which converts the analog read signal output by the pre-amplifier into a digital signal;
a discrete Fourier transformer which executes a discrete Fourier transformation of the digital signal output from the analog-to-digital converter and outputs a corresponding discrete Fourier transformed signal;
a processor which generates a first control signal based on the discrete Fourier transformed signal;
a control circuit which is responsive to the first control signal to output a second control signal to the magnetic head which adjusts a distance between the magnetic head and the data storage medium; and
a humidity sensor which senses an internal humidity of the data storage device and outputs a corresponding humidity signal, wherein the processor generates the first control signal further based on the humidity signal output from the humidity sensor.

7. The data storage device of claim 1, wherein the processor outputs the first control signal based on a pre-stored measured correlation between the discrete Fourier transformed signal and the distance between the magnetic head and the data storage medium.

8. The data storage device of claim 1, wherein the control circuit is part of the pre-amplifier.

9. A data storage device comprising:
a data storage medium;
a magnetic head which reads a pattern from the data storage medium and generates a corresponding analog read signal;
a pre-amplifier which amplifies the analog read signal output from the magnetic head and outputs a corresponding amplified analog read signal;
an analog-to-digital converter which converts the analog read signal output by the pre-amplifier into a digital signal;
an adaptive digital filter which filters the digital signal output by the analog-to-digital converter, the adaptive digital filter comprising a plurality of taps at which a respective plurality of filter coefficients are applied, wherein the filter coefficients are adaptively set in accordance with an output of the adaptive digital filter and an adaptive algorithm, and wherein at least one of the filter coefficients is correlative of a distance between the magnetic head and the data storage medium;
a processor which generates a first control signal based on at least one of the filter coefficients of the adaptive digital filter; and
a control circuit which is responsive to the first control signal to output a second control signal to the magnetic head which adjusts the distance between the magnetic head and the data storage medium.

10. The data storage device of claim 9, further comprising an air bearing slider which includes the magnetic head and an air bearing surface, wherein a thermal expansion of the air bearing surface is controlled by the second control signal to adjust the distance between the magnetic head and the data storage medium.

11. The data storage device of claim 9, wherein the adaptive digital filter is a finite impulse response filter.

12. The data storage device of claim 9, wherein the control circuit is part of the pre-amplifier.

13. The data storage device of claim 9, wherein the at least one coefficient among the plurality of coefficients is a coefficient of a fifth tap among the plurality of taps.

14. The data storage device of claim 9, wherein the second control signal is a voltage or current for flying-on-demand.

15. The data storage device of claim 9, further comprising a temperature sensor which senses an internal temperature of the data storage device and outputs a corresponding temperature signal, wherein the processor outputs the first control signal further based on the temperature signal output from the temperature sensor.

16. The data storage device of claim 9, further comprising a humidity sensor which senses an internal humidity of the data storage device and outputs a corresponding humidity signal, wherein the processor outputs the first control signal further based on the humidity signal output from the humidity sensor.

17. The data storage device of claim 11, wherein the processor outputs the first control signal based on a pre-stored measured correlation between the at least one of the filter coefficients and the distance between the magnetic head and the data storage medium.

18. A method of adjusting a distance between an air bearing slider and a data storage medium of a data storage device, the method comprising:
reading a pattern from an area of the data storage medium and outputting a read signal using a read head of the air bearing slider;
amplifying the read signal and outputting an amplified read signal;
outputting a first control signal based on the amplified read signal using a channel circuit;
calculating a distance between the read head and the data storage medium based on the first control signal and generating a second control signal based on a result of the calculation, using a processor; and
outputting a third control signal for controlling the distance between the air bearing slider and the data storage medium;
wherein when the channel circuit outputs as the first control signal a signal corresponding to one coefficient among a plurality of coefficients of an adaptive finite impulse response filter based on the amplified read signal output from the pre-amplifier, and the processor generates the second control signal based on a correlation between the first control signal and the distance between the read head and the data storage medium.

19. The method of claim 18, wherein when the channel circuit executes a discrete Fourier transform of a third harmonic included in the amplified read signal output from the pre-amplifier and outputs the first control signal based on a result of the transform, and the processor generates the second control signal based on a correlation between the first control signal and the distance between the read head and the data storage medium.

20. A method of adjusting a distance between an air bearing slider and a data storage medium of a data storage device, the method comprising:

reading a pattern from an area of the data storage medium and outputting a read signal using a read head of the air bearing slider;

amplifying the read signal and outputting an amplified read signal;

converting the amplified signal to a digital signal; executing a discrete Fourier transform on the digital signal; outputting a first control signal based on the discrete Fourier transform on the digital signal;

calculating a distance between the read head and the data storage medium based on the first control signal and generating a second control signal based on a result of the calculation, using a processor;

outputting a third control signal for controlling the distance between the air bearing slider and the data storage medium; and sensing at least one of an internal temperature and an internal humidity of the data storage device using a sensor which is independent of the read head, and supplying an output signal of the sensor to the processor, wherein the processor calculates the distance between the read head and the data storage medium based on the first control signal and the at least one of sensed internal temperature and sensed internal humidity, and generates the second control signal based on a result of the calculation.

21. The method of claim 19, wherein the correlation is measured and calculated during burn-in.

22. The method of claim 18, wherein the correlation is measured and calculated during burn-in.

\* \* \* \* \*